(12) United States Patent
Byrne et al.

(10) Patent No.: US 7,526,606 B2
(45) Date of Patent: Apr. 28, 2009

(54) HIGH-SPEED REDUNDANT DISK CONTROLLER METHODS AND SYSTEMS

(75) Inventors: Richard J. Byrne, Hillsborough, NJ (US); Silvester Tjandra, Singapore (SG); Eu Gene Goh, Singapore (SG)

(73) Assignee: Agere Systems, Inc., Allentown, PA (US)

( * ) Notice: Subject to any disclaimer, the term of this patent is extended or adjusted under 35 U.S.C. 154(b) by 313 days.

(21) Appl. No.: 11/518,543

(22) Filed: Sep. 8, 2006

(65) Prior Publication Data
US 2008/0065827 A1 Mar. 13, 2008

(51) Int. Cl.
*G06F 12/00* (2006.01)

(52) U.S. Cl. .................. 711/114; 711/158; 711/170; 711/202; 709/214; 709/251; 714/6

(58) Field of Classification Search .................. 711/114, 711/158, 170, 202; 709/214, 251; 714/6
See application file for complete search history.

(56) References Cited

U.S. PATENT DOCUMENTS

| | | | |
|---|---|---|---|
| 6,651,154 B1 * | 11/2003 | Burton et al. | 711/202 |
| 6,904,498 B2 * | 6/2005 | Stolowitz | 711/114 |
| 2003/0188032 A1 * | 10/2003 | Solomon et al. | 709/250 |
| 2003/0188098 A1 * | 10/2003 | Baxter, III | 711/114 |
| 2003/0188099 A1 * | 10/2003 | Baxter, III | 711/114 |
| 2003/0188100 A1 * | 10/2003 | Solomon et al. | 711/114 |
| 2008/0065930 A1 * | 3/2008 | Byrne et al. | 714/6 |

\* cited by examiner

*Primary Examiner*—Stephen C Elmore

(57) ABSTRACT

Various apparatus and methods for controlling data for a redundant array of inexpensive/independent disks (RAID) are presented. For example, in one illustrative embodiment, a controlling apparatus can include a translation device capable of reading data from a plurality of N disks, wherein the data of the N disks has a format consisting of a sequence of block stripes with each block containing one or more sector stripes, and wherein each sector stripe is formatted such that N−1 of the sectors contain contiguous target data and the remaining sector contains parity data for the other N−1 target data sectors.

20 Claims, 6 Drawing Sheets

HIGH-SPEED REDUNDANT DISK CONTROLLER METHODS AND SYSTEMS

FIELD OF THE DISCLOSURE

This disclosure pertains to the field of high-speed and reliable disk storage systems.

BACKGROUND

In the data storage arts, the term "RAID" stands for a "redundant array of inexpensive disks" (or alternatively a "redundant array of independent disks") and refers to a system that uses multiple hard drives to share or replicate data. In its original implementations, the key advantage to a RAID system was the ability to combine multiple low-cost devices using older technology into a storage disk array that offered greater performance than what was affordably available in a single device using the newest technology. Depending on the RAID version chosen, the benefits of RAID systems include (as compared to single drives) one or more of increased data integrity, fault-tolerance, throughput and capacity.

A RAID system is typically used on server computers, and is usually (but not necessarily) implemented with identically-sized disks. However, with decreases in hard drive prices and wider availability of RAID options built into motherboard chipsets, RAID is also being found and offered as an option in more advanced personal computers. This is especially true in computers dedicated to storage-intensive tasks, such as video and audio editing.

Two particular RAID levels of interest, known as RAID 4 and RAID 5, operate by distributing data over a plurality of disk with redundant parity information assigned to a single disk (RAID 4) or distributed among the various disks (RAID 5). Some of the primary advantages to RAID 4 and RAID 5 systems are that large amounts of data can be quickly off-loaded to external devices while the failure of a single disk could be handled albeit with some performance degradation.

Unfortunately, when a disk does fail in a RAID 4 or RAID 5 system, it is necessary to replace the failed disk and reconstruct the lost data using the remaining disks, a task that can be very difficult if the RAID is busy delivering large amounts of data over long periods of time, and very important as the loss of another disk in the interim would mean a loss of all of the data on the RAID system. Further, present RAID 4 and RAID 5 systems are not well suited for high-speed streaming data, especially in the event of a failure. Thus, new technology related to improving RAID performance is desirable.

SUMMARY

In an illustrative embodiment, an apparatus for controlling data for a redundant array of inexpensive/independent disks (RAID) includes a translation device capable of reading data from a plurality of N disks, wherein the data of the N disks has a format consisting of a sequence of block stripes with each block containing one or more sector stripes, and wherein each sector stripe is formatted such that N−1 of the sectors contain contiguous data and the remaining sector contains parity data for the other N−1 sectors.

In another embodiment, a system for storing and retrieving data includes a plurality of N disks, wherein data of the N disks has a format consisting of a sequence of block stripes with each block containing one or more sector stripes, and wherein each sector stripe is formatted such that N−1 of the sectors contain contiguous data, and the remaining sector contains parity data for the other N−1 sectors.

In yet another embodiment, a method for storing a stream of data on a redundant array of inexpensive/independent disks (RAID) includes separating the stream of data into blocks of data with each block containing (N−1)×M sectors of data, where N is the number of disks in the RAID and M is an integer greater than zero, organizing each block of data into M sub-blocks with each sub-block having (N−1) sectors of contiguous data, and for each sub-block of data, storing the sub-block's sectors into a respective disk of the RAID to create a sector stripe.

DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
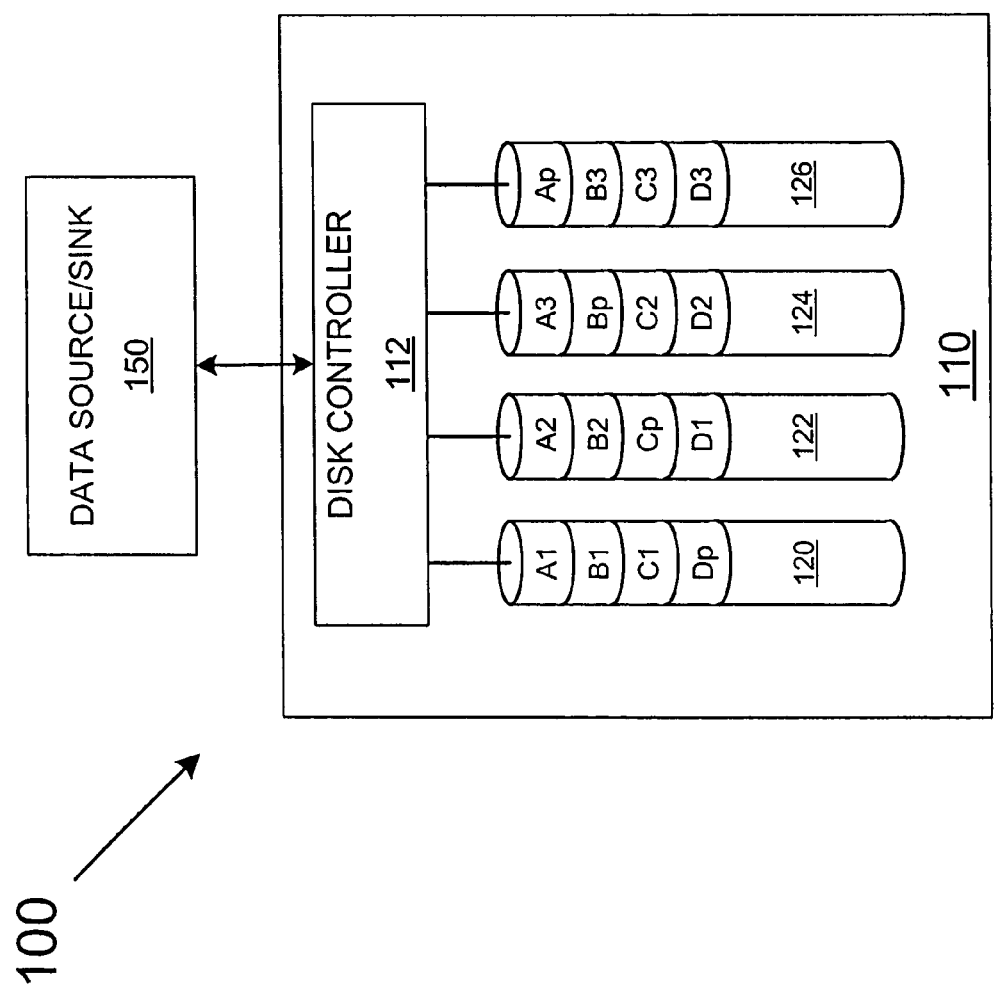
FIG. 1 is an exemplary system using a RAID storage system.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

The various advantages offered by the disclosed methods and systems include providing an improved RAID controller that is not only less expensive but that offers a performance increase of several times that of conventional RAID systems. For example, an eight (8)-disk RAID 5 system using an exemplary controller can not only simultaneously provide eight separate MPEG data streams to the outside world, but the effects of a single disk failure is typically limited to less than a few milliseconds of interrupted data, after which the RAID system will perform as before. Further, upon replacement of the failed disk, the exemplary RAID controller can perform data reconstruction on the replacement disk again without interrupting the eight outbound MPEG data streams. Accordingly, while the disclosed RAID systems can be used for practically any use, their advantages are particularly prominent when used to store and retrieve streaming data such as MPEG data, other video data, music, animations, background scenes for games and so on.

For the purpose of this disclosure the term "block stripe" (and its derivatives) shall refer to its commonly known meaning in the RAID storage arts as a data structure having multiples segments spanning multiple disks.

Further the term "sector stripe" shall refer to a data structure of related data being of one sector in depth and spanning multiple disks. See, FIG. 2 for examples of sector stripes S1, S2 and S3.

Still further, the term "target data" shall refer to some data content to be received from an external source and stored and/or stored to be delivered to an external device, such as an MPEG data stream. Target data does not by itself generally affect the operation of a disk.

Also, the term "parity data" shall refer to its commonly known meaning in the RAID storage arts as the XOR product of multiple bytes, segments, blocks and so on.

Figure 2:
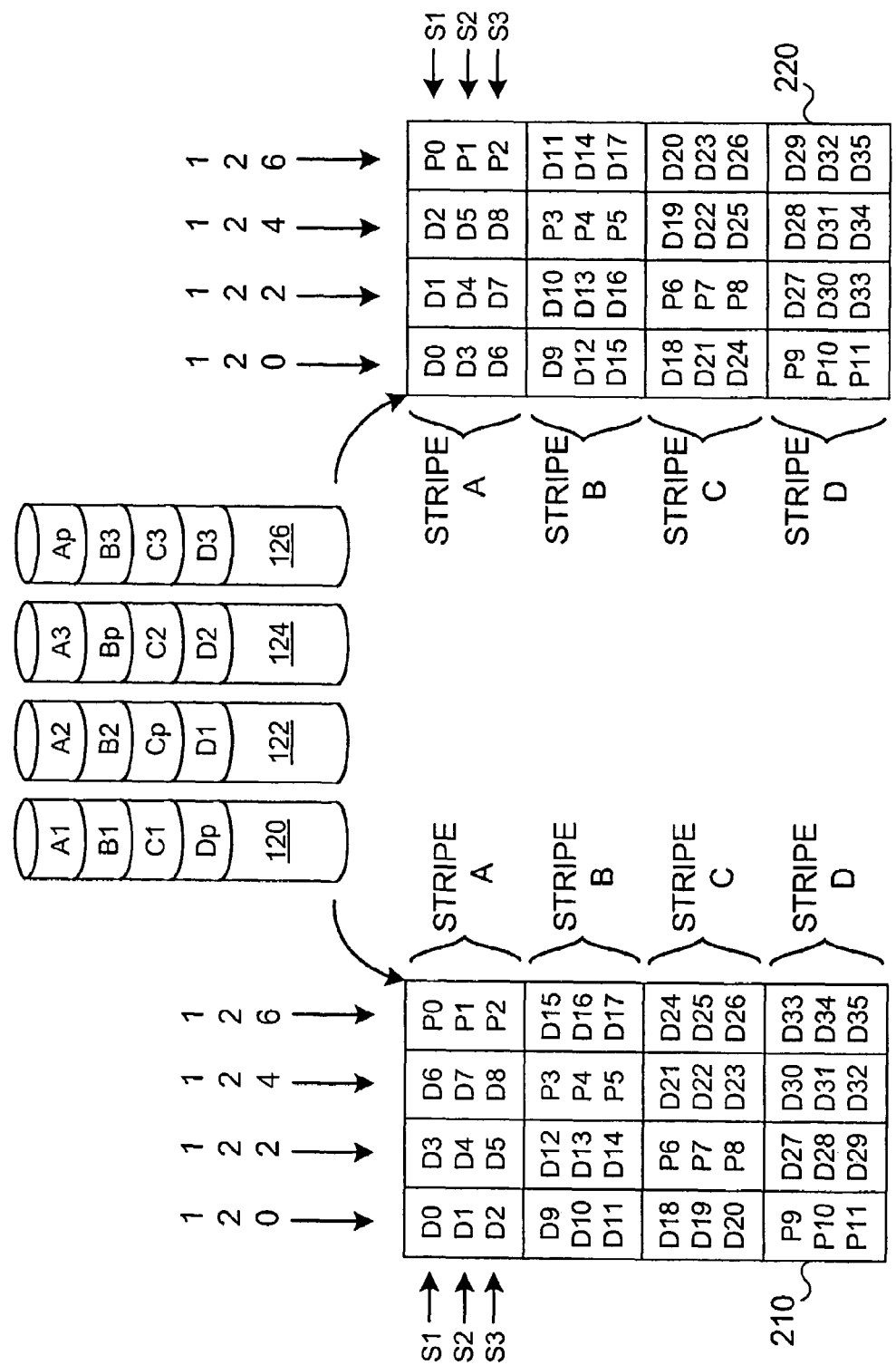
FIG. 2 depicts data storage on both a conventional RAID system as well as on an improved RAID system according to the present disclosure.

FIG. 1 is an exemplary system 100 using RAID-based storage technology. As shown in FIG. 2, the exemplary system 100 includes a data source/sink 150 coupled to a RAID storage system 110. The exemplary RAID storage system 110, in turn, includes four hard disks 120-126 controlled by a common disk controller 112.

In a first mode of operation, the data source/sink 110 can provide target data to the RAID storage system 110 upon which the disk controller 112 can receive the data and divide the received data into separate blocks. In the present embodiment where four disks 120-126 are used, a parity sector is generated for every three target data sectors in a block to produce a separate "stripe" of four sectors. Then each stripe of sectors is used to form part of a stripe of blocks stored in the various disks 120-126. Depending on whether a RAID 4 or a RAID 5 system is specified, the disk controller 112 will store the parity blocks on a single disk 120-122, 124 or 126 or distribute the parity blocks among the four disks 120-126.

The exemplary disk controller 112 can store data in the disks 120-126 according to a modified format (compared to conventional RAID systems) that can increase data throughput while decreasing internal memory requirements.

For example, FIG. 2 depicts the differences between the way data is stored in a conventional RAID system 210 as compared to the modified RAID storage format used in an exemplary RAID system 220. As shown in FIG. 2, for both systems 210 and 220, each stripe of blocks consists of nine (9) target data sectors and three (3) parity data sectors. Also, as the exemplary two systems 210 and 220 are representative of RAID 5 architecture, the various parity sectors P0-P11 are distributed/rotated among the four disks 120-126 as a function of block number/location.

As also shown in FIG. 2 (on the bottom left) for the conventional storage system 210, the nine target data sectors D0-D8 of block stripe A are organized in groups of contiguous data {D0,D1,D2}, {D3,D4,D5} and {D6,D7,D8} respectively located on disks 120, 122 and 124 with disk 126 containing parity data sectors {P0, P1, P2}. A similar organization is shown for block stripes B, C and D with parity data shifting to disks 124, 122 and 120 respectively. The consequence of this data organizations is that while data is contiguous on a per-disk basis, the data is non-contiguous for any given sector stripe.

For example, the three sector stripes S1, S2 and S3 of block stripe A data are arranged in groups having non-contiguous target data sectors {D0,D3,D6,P0}, {D1,D4,D7,P1} and {D2,D5,D8,P2} with parity sector P0 being derived by non-contiguous data sectors D0, D4 and D7, parity sector P1 being derived by non-contiguous data sectors D1, D5 and D8, and parity sector P2 being derived by non-contiguous data sectors D2, D6 and D9. Similar consequences are found for block stripes B, C and D.

In contrast to the storage technique used for conventional RAID 4 and RAID 5 systems, the modified storage system 220 (bottom right) organizes data non-contiguously along disk boundaries but contiguously along the sector stripes. Accordingly, sector stripes S1, S2 and S3 are grouped into contiguous target data sectors {D0,D1,D2,P0}, {D3,D4,D5,P1} and {D6,D7,D8,P2} respectively. Further, parity sector P0 is derived from contiguous data sectors D0-D2, parity sector P1 is derived from contiguous data sectors D3-D5, and parity sector P2 is derived from contiguous data sectors D6-D8.

The format of the modified system 220 gives rise to several advantages. The first advantage is that contiguous data can be read faster from the disks 120-126 in smaller increments while still checking parity. That is, in order to read contiguous data sectors D0-D2, a RAID controller may take three times the amount of time using the conventional system 210 as with the modified system.

Further, for situations where all nine data sectors D0-D8 must be provided in their natural order (e.g., for certain high-speed applications, such as providing MPEG streams), contiguous data sectors can be extracted using a memory buffer having one-third the size of conventional systems by serially uploading stripes S1, S2 and S3—one at a time—before forwarding the data off system.

Still further, data uploading and reconstruction after a disk failure may be simultaneously performed a sector stripe at a time with little or no impact on data delivery performance, and parity information may be more easily derived.

Returning to FIG. 1, in a second mode of operation the RAID storage system 110 can upload target data from its disks 120-126, and deliver the uploaded data to the data source/sink 150. In this retrieval/read mode, the disk controller 112, after receiving a data retrieval/read request from the data source/sink 150, can direct the various disks 120-126 to simultaneously recall the requested data from the appropriate sector stripes on the disks 120-126. Again, referring to FIG. 2, given that the position of a parity sector may vary as a function of block number/position the disk controller 112 may need to determine which disk 120-126 contains parity information, and either upload only the target data-bearing sectors (one sector stripe at a time) or optionally upload the entire sector stripe including parity data.

Depending on the embodiment, the disk controller 112 can store both target data and parity data in a block of RAM, then perform a parity check from the RAM. The parity check results for each sector stripe can then be forwarded to the source/sink 150.

Alternatively, the disk controller 112 can forego any parity check and simply provide the target data to the source/sink 150.

In addition to the standard read mode described above, the exemplary disk controller 112 can use an alternative read mode, sometimes referred to as the "degraded mode" of a RAID system. In the degraded mode, one of the disks 120-126 is assumed to have failed. However, because of the redundant information provided by the parity sectors, the data of each sector stripe can be faithfully reconstructed, and the reconstructed data can be forwarded to the data source/sink 150 along with the target data.

It should be appreciated that in a RAID 4 or RAID 5 system, the degraded mode and/or the rebuilding time necessary to recreate data onto a replacement disk is considered the window at which the RAID array is most vulnerable to data loss. During this time, if a second disk failure occurs, data is unrecoverable.

Conventional RAID controlling systems typically use some form of software solution to handle degraded operational modes or rebuilding—either relying on the host processor of a server or personal computer or a special embedded processor on a "hardware solution" board, to perform data reconstruction.

In contrast, the exemplary RAID processor 112 takes a gate-level hardware approach to reconstructing lost data. Because of the gate-level solution, data reconstruction can take literally but a few clock cycles, as opposed to the hundreds of clock cycles for software approaches or pseudo-hardware (i.e., embedded processor) approaches.

Because of the gate-level hardware approach to data reconstruction, the disk controller 112 suffers little or no appreciable loss of performance due to a disk failure due to the negligible added overhead. This approach not only allows the correct data to be passed to the data source/sink 150, but also allows the disk controller 112 to reconstruct data on a failed disk while simultaneously providing target data to the outside world.

Further, because of the lower memory requirements due to the use of contiguous data sector stripes, overall costs of the added gate-level parity checking are balanced with the lowered costs of using smaller memory buffers.

Figure 3:
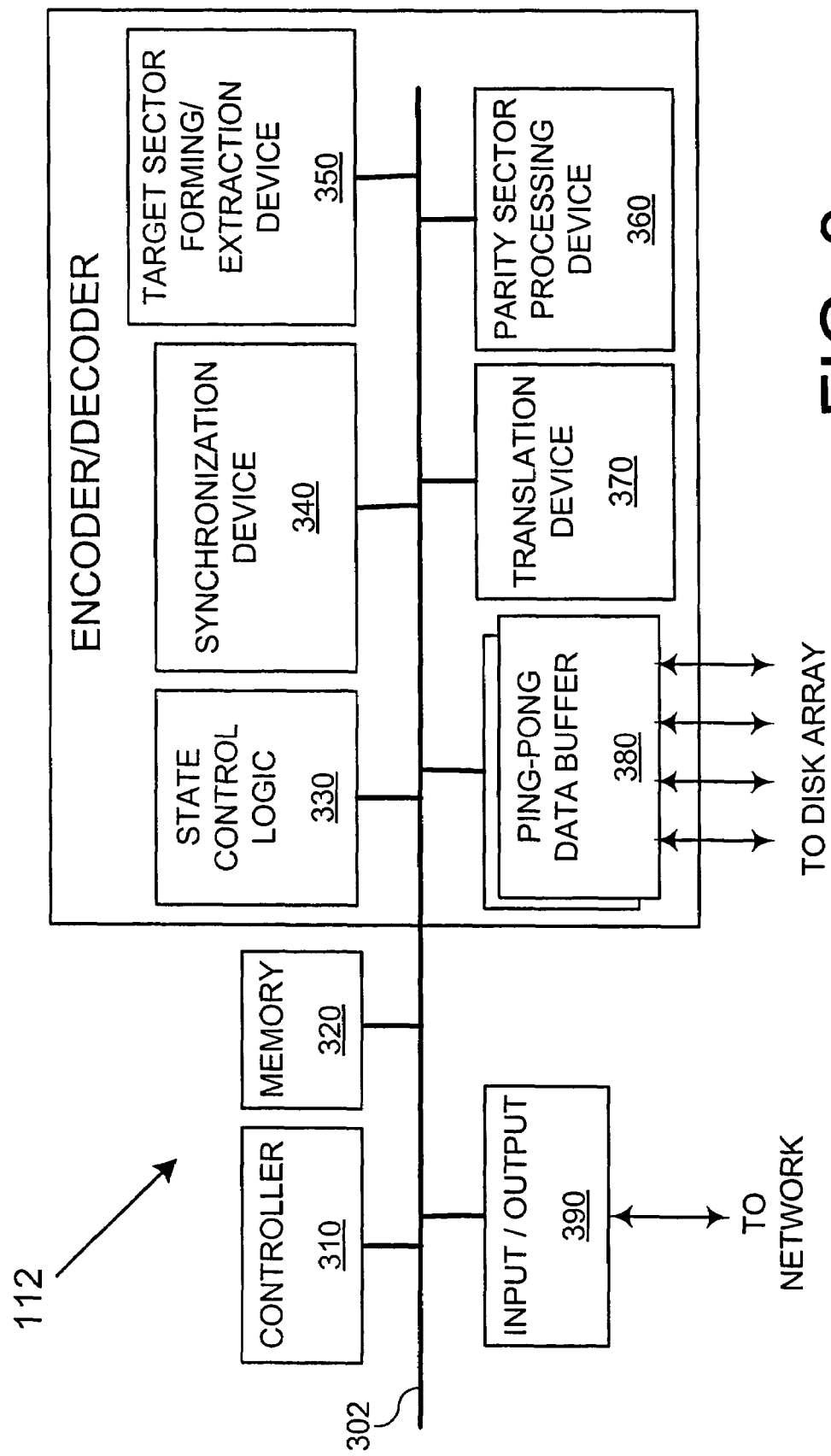
FIG. 3 is a portion of an exemplary RAID controller according to the present disclosure.

FIG. 3 is a portion of an exemplary RAID disk controller 112 according to the present disclosure capable of controlling a RAID array of N disks. As shown in FIG. 3, the RAID disk controller 112 includes a controller 310, a memory 320, state control logic 330, a synchronization device 340, a target data sector forming/extraction device 350, a parity sector processing device 360, a translation device 370, a ping-pong data buffer 380 and an input/output device 390.

Although the exemplary RAID disk controller 112 of FIG. 3 uses a bussed architecture, it should be appreciated that any other architecture may be used as is well known to those of ordinary skill in the art. For example, in various embodiments, the various components 310-390 can take the form of separate electronic components coupled together via a series of separate busses, or alternatively a collection of dedicated logic arranged in a highly specialized architecture and implemented with gate-level logic.

It also should be appreciated that some of the above-listed components 330-370 can take the form of software/firmware routines residing in memory 320 and be capable of being executed by the controller 310, or even software/firmware routines residing in separate memories in separate servers/computers being executed by different controllers.

Returning to FIG. 3, components 330-380 can be conceptually grouped into what can be referred to as an "encoder/decoder", i.e., a device that organizes data on a collection of RAID disks. While in various embodiments an encoder/decoder may be an amalgam of nearly endless combinations of hardware and software, it should be appreciated that, as discussed above, by implementing key portions of the exemplary translator as gate-level hardware solutions, performance can be greatly improved.

In operation and under control of the state control logic 330, the synchronization device 340 can start and synchronize the N number of disks controlled by the disk controller 112.

For incoming target data to be written onto the disks, the target sector forming/extraction device 350 can receive the target data from the input/output device 390, and break the target data into contiguous portions that could be accommodated by (N−1) sectors. Again as noted above, when insufficient target data is available, some sectors may be padded with zeros. The target sector forming/extraction device 350 may also add header information, checksums and other information to each sector as may be necessary or desired. Note that the target sectors can be formed and modified in one of the ping-pong data buffers 380.

Simultaneously, the translation device 370 can determine where the current target data sectors formed by the target sector forming/extraction device 350 are to be written within the RAID systems' disks, and which of the N disk should contain parity information.

Using the N−1 sectors of data formed by the target sector forming/extraction device 350, the parity sector processing device 360 can generate a complementary parity sector. For the present embodiment, the parity sector processing device 360 is implemented with gate-level hardware such that the parity sector can be generated in as little as a single clock cycle, which represents significant performance improvement over known systems. As with the target data sectors, each parity sector may be calculated 'on the fly' from the Data Sector's passing through the encoder sector unit buffer. Notably, the encoder and decoder can operate simultaneously.

Once all sectors of a sector stripe are appropriately formed in one of the ping-pong data buffers 380, the translation device 370 can cause the appropriate ping-pong data buffer 380 to deliver the sector stripe of data to the N disks for simultaneous storage.

By repeating the various processes described above, the various components 330-380 of the encoder/decoder can form a pattern of sector stripes consistent with the sector layout shown in FIG. 2.

While read operations are obviously quite different from write operations, the same general components 330-380 can nonetheless be used. During a read operation, the state control logic 330 can cause the translation device 370 to determine the block stripe and sector stripe locations of some data of interest. Subsequently, the state control logic 330 can cause the ping-pong data buffers 380 to load the appropriate sector stripes one after the other. After each sector stripe is fully uploaded, the parity sector processing device can perform a parity check to determine data integrity while the target data forming/extraction device 350 can extract the target data, which can be offloaded to an intended location via the input/output device 390.

In situations where a sector is determined to hold bad data (e.g., via a bad checksum or a failure status flag from one of the N drives), the exemplary encoder/decoder can employ the parity sector processing device 360 to reconstruct either the missing target data or parity data. The target data could then be offloaded. Should a replacement disk be provided for the failed disk, reconstructed data sectors could be written to the replacement disk even in situations where multiple streams of data are being uploaded and delivered to an external device.

Figure 4:
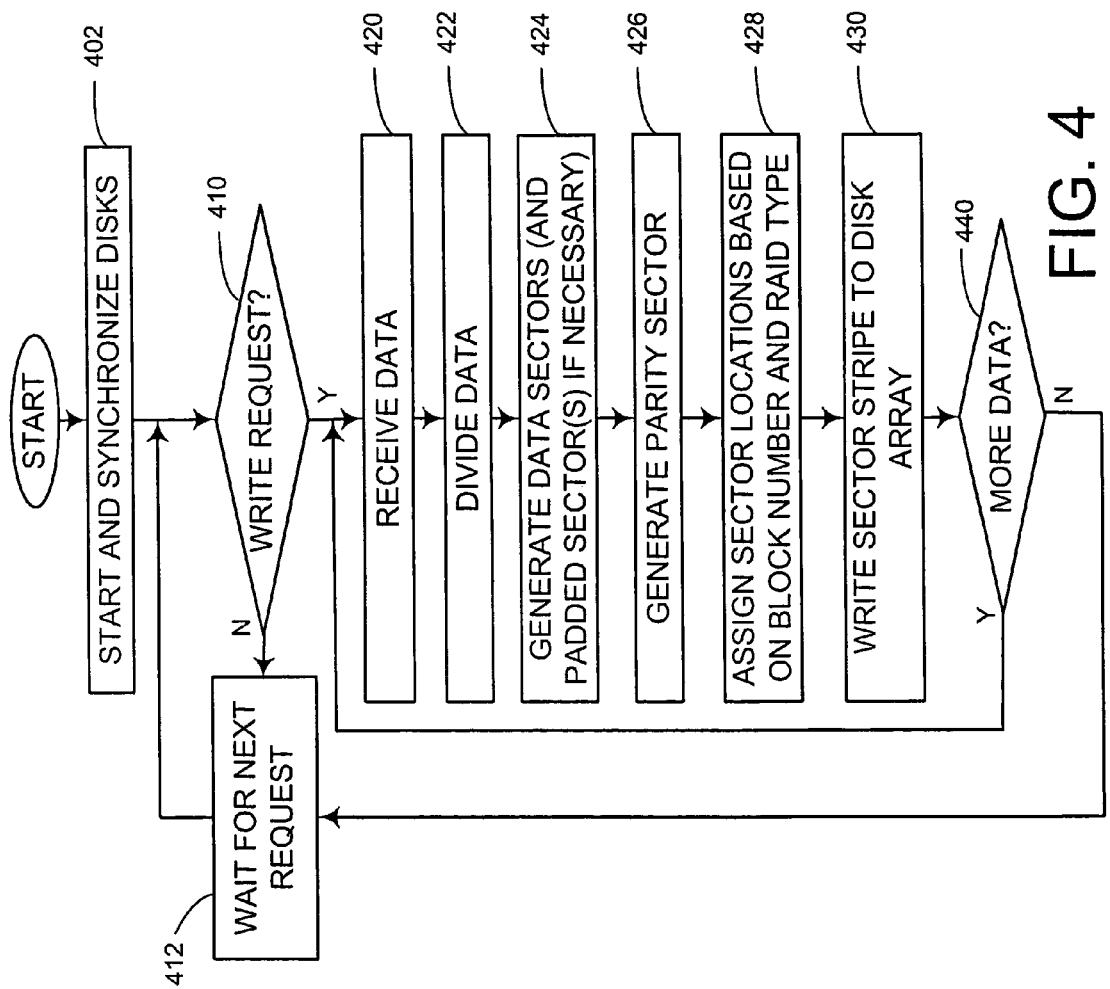
FIG. 4 is a flowchart outlining an exemplary data storage procedure according to the present disclosure.

FIG. 4 is a flowchart outlining an exemplary data storage procedure for a RAID system according to the present disclosure. The process starts in step 402 where the RAID system is started and its disks synchronized. Then, in step 410, a determination is made as to whether a request has been made to write data to the RAID. If a write request has been made, control continues to step 420; otherwise, control jumps to step 412 where the process waits for a next request (read, write or otherwise) and a subsequent write determination in step 410 is made.

In step 420, the RAID system can receive incoming data. Next, in step 422, the received target data is divided into contiguous sections. Then, in step 424, the contiguous sections of data can be used to create an appropriate number of contiguous sectors for a sector stripe. Zero padding of the sectors may be used if insufficient data is available to create an entire sector stripe. Control continues to step 426.

In step 426, a parity sector is created based on the sectors of step 424. Then, in step 428, the sectors can be assigned to an appropriate disk, which for a RAID 4 system would be a single predetermined disk and for a RAID 5 system would be determined as a function of block stripe number/location. Then, in step 430, a sector stripe can be written to the RAID disks in a manner consistent with the modified system 220 of FIG. 2. Control continues to step 440.

In step 440, a determination is made as to whether there is more data to be stored. If more data is to be stored, control jumps back to step 420; otherwise, control jumps back to step 412 where the process waits for another request.

Figure 5:
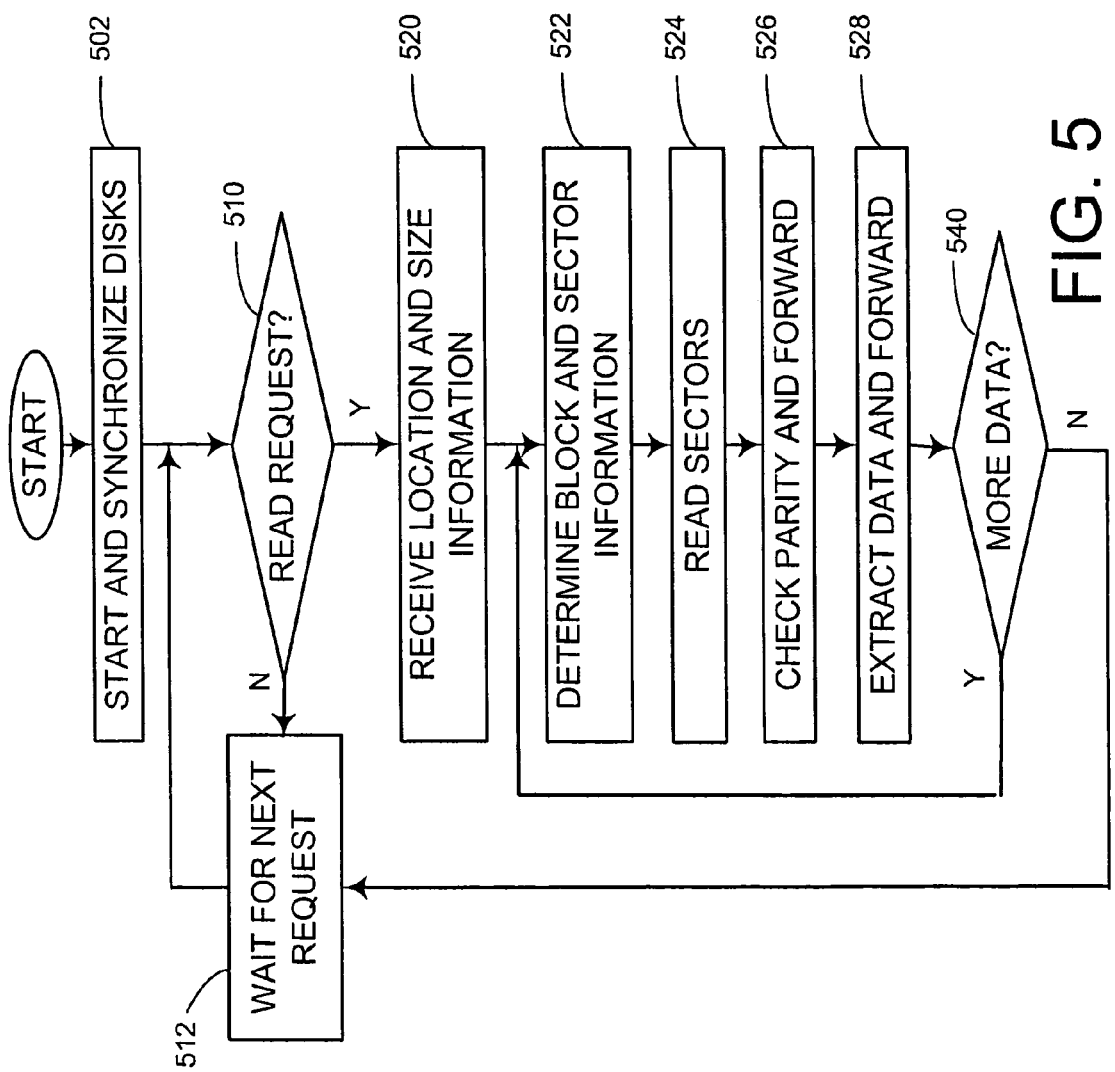
FIG. 5 is a flowchart outlining an exemplary data retrieval procedure according to the present disclosure.

FIG. 5 is a flowchart outlining an exemplary data retrieval/read procedure for the RAID system according to the present disclosure. The process starts in step 502 where a RAID system is started and the disks synchronized. Then, in step 510, a determination is made as to whether a request has been made to read data from the RAID. If a read request has been made, control continues to step 520; otherwise, control jumps to step 512 where the process waits for a next requests (read, write or otherwise) and a subsequent write determination in step 510 is made.

In step 520, the location and size of the data to be retrieved is received. Next, in step 522, the block information, i.e., where the data is stored, and the sector information, i.e., which sectors contain target data and which contain parity data, is determined. Then, in step 524, an appropriate sector stripe can be read from the RAID systems' disks. Control continues to step 526.

In step 526, a parity check can be performed on the read sector stripe, and the results can be optionally forwarded to any device that might make use of the information. Next, in step 528, the target data can be extracted from the read sector stripe and forwarded to the intended recipient. Control continues to step 540.

In step 540, a determination is made as to whether there is more data to be retrieved. If more data is to be retrieved, control jumps back to step 522; otherwise, control jumps back to step 512 where the process waits for another request.

Figure 6:
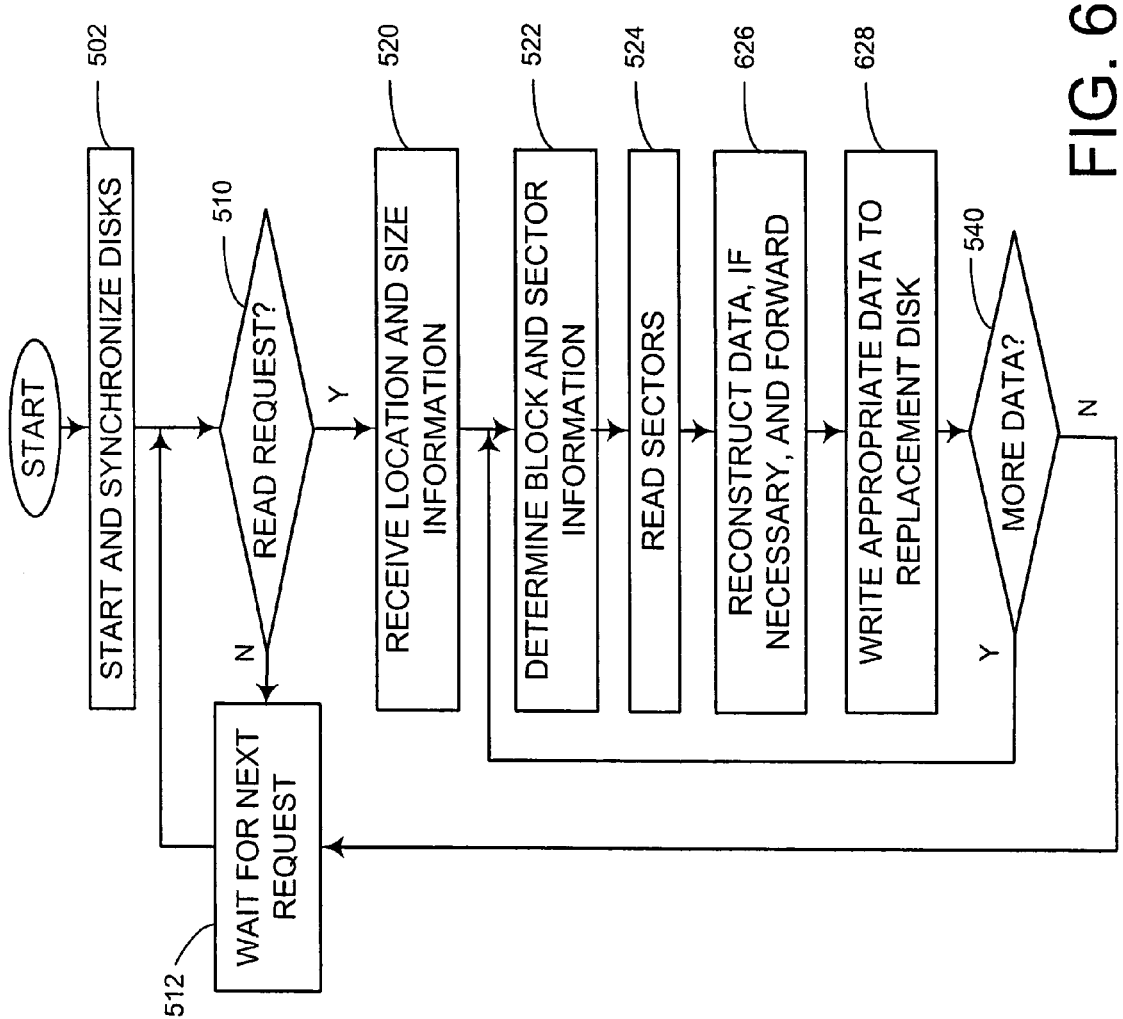
FIG. 6 is a flowchart outlining an exemplary data retrieval and rebuilding procedure according to the present disclosure.

FIG. 6 is a flowchart outlining an exemplary degraded mode data retrieval and rebuilding procedure according to the present disclosure, which assumes that a disk has failed and/or a replacement disk has been supplied. As shown in FIG. 6, the procedure is very similar to that of FIG. 5 with the exception of steps 626 and 628 replacing steps 526 and 528. In step 626, data from a failed disk is reconstructed using the remaining operational disks, assuming that the failed disk would not be supplying parity data. If the failed disk is known to carry a parity sector for the current sector stripe, then no data reconstruction may be necessary. The target data can then be forwarded to its intended destination.

In step 628, parity data can be reconstructed, if necessary or desired, and the sector of lost target or parity data can be written to the replacement disk.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. An apparatus for controlling data for a redundant array of inexpensive/independent disks (RAID), comprising:
a translation device capable of arranging data on a plurality of N disks, wherein the data of the N disks has a format consisting of a sequence of block stripes with each block stripe containing one or more sector stripes, and wherein each sector stripe is formatted such that N−1 of the sectors contain contiguous target data and the remaining sector contains parity data for the other N−1 target data sectors.

2. The apparatus of claim 1, wherein all sectors containing parity information are located on a single disk of the N disks.

3. The apparatus of claim 1, wherein sectors containing parity information are distributed among the N disks as a function of block number or location.

4. The apparatus of claim 1, wherein each block stripe contains a plurality of sector stripes.

5. The apparatus of claim 1, further comprising a synchronization device capable of synchronizing the N disks such that the device can simultaneously read from each disk a respective sector belonging to a single stripe sector.

6. The apparatus of claim 5, further comprising a parity error processing device that determines whether a read sector stripe has a parity error.

7. The apparatus of claim 5, wherein the parity error processing device is capable of reporting parity status for every sector stripe read from the N disks.

8. The apparatus of claim 5, further comprising a memory block that contains enough memory to hold a sector stripe, but not enough memory to hold a block stripe.

9. The apparatus of claim 5, further comprising a memory block having a ping-pong memory configuration containing two separate memory spaces with each memory space containing enough memory to hold a sector stripe, but not enough memory to hold a block stripe.

10. The apparatus of claim 6, wherein the parity error processing device is configured to use parity data in the event of a disk failure to reconstruct target data.

11. A system for storing and retrieving data, comprising:
a plurality of N disks, wherein data of the N disks has a format consisting of a sequence of block stripes with each block stripe containing one or more sector stripes, and wherein each sector stripe is formatted such that N−1 of the sectors contain contiguous target data, and the remaining sector contains parity data for the other N−1 sectors.

12. The system of claim 11, further comprising a translation means for reading data from the plurality of N disks in sector stripe units, extracting the target data from the parity data and providing the target data to an external device.

13. The system of claim 11, wherein each block stripe contains a plurality of sector stripes.

14. The system of claim 11, further comprising a synchronization means for synchronizing the N disks such that target data from a common sector stripe can be simultaneously read from each disk.

15. The system of claim 11, further comprising a device configured to simultaneously write data in sector stripe units from the plurality of N disks.

16. A method for storing a stream of data on a redundant array of inexpensive/independent disks (RAID), comprising:
separating the stream of data into blocks of data with each block of data containing (N−1)×M sectors of data, where N is the number of disks in the RAID and M is an integer greater than zero;
organizing each block of data into M sector stripes with each sector stripe having (N−1) sectors of contiguous data; and
storing each sector stripe into a respective disk of the RAID to create a stored sector stripe.

17. The method of claim 16, wherein for each sector stripe of data, further generating a sector of parity data for each (N−1) contiguous sectors of data of a sector stripe, and including the sectors of parity data into respective stored sector stripes.

18. The method of claim 17, further comprising distributing sectors of parity data among the N disk as a function of block number or location.

19. The method of claim 17, wherein the step of storing sectors into a respective disk of the RAID is caused to occur in a substantially simultaneous timeframe by synchronization hardware.

20. The method of claim 17, wherein each sector contains multiple bytes of data.

* * * * *